United States Patent [19]

Hadgraft et al.

[11] 4,055,694

[45] * Oct. 25, 1977

[54] STARCH LATEX COMPOSITION

[75] Inventors: Robert B. Hadgraft, East Ridge; John J. Martin, Hixson, both of Tenn.

[73] Assignee: Reichhold Chemicals, Inc., White Plains, N.Y.

[*] Notice: The portion of the term of this patent subsequent to Dec. 18, 1990, has been disclaimed.

[21] Appl. No.: 673,999

[22] Filed: Apr. 5, 1976

Related U.S. Application Data

[63] Continuation-in-part of Ser. No. 461,471, April 16, 1974, abandoned.

[51] Int. Cl.$^2$ .......................... B32B 3/02; C08L 3/02; D04H 11/00; D05C 17/02
[52] U.S. Cl. .............................. 428/95; 260/17.4 ST; 428/97
[58] Field of Search ................. 260/17.4 ST; 428/95, 428/97

[56] References Cited

U.S. PATENT DOCUMENTS

| | | | |
|---|---|---|---|
| 2,537,114 | 1/1951 | Young et al. | 260/17.4 |
| 3,259,596 | 7/1966 | Downer et al. | 260/17.4 |
| 3,305,500 | 2/1967 | Downer et al. | 260/17.4 |
| 3,728,141 | 4/1973 | Ray-Chaudhuri | 260/17.4 |
| 3,779,857 | 12/1973 | Hadgraft et al. | 260/17.4 |

OTHER PUBLICATIONS

Chem. Absts., vol. 72:113008p, "Pigment Binder for Paper Coating", Konishi.

Primary Examiner—Edward M. Woodberry

[57] ABSTRACT

A latex composition is provided comprising a polymeric latex and an extender consisting essentially of a mixture of granular starch and borax. This extender can be used at relatively high levels in the polymeric latex without substantially deleteriously affecting the properties of the latex when used for coating textiles.

9 Claims, No Drawings

STARCH LATEX COMPOSITION

CROSS-REFERENCE TO RELATED APPLICATIONS

This application is a continuation-in-part of application Ser. No. 461,471 entitled "Starch Latex Composition", filed on Apr. 16, 1974, now abandoned.

BACKGROUND OF THE INVENTION

This invention relates to a latex composition. More particularly, this invention relates to a latex composition comprising a polymeric latex and an extender.

The term "latex" was originally applied to aqueous dispersions of natural rubber. This term is now used in the art to refer to aqueous dispersions of natural rubber, aqueous dispersions of synthetic elastomers and mixtures thereof.

Latex has a wide variety of commercial uses. The latex composition of the present invention is particularly suitable for laminating textiles, i.e., carpeting. In the manufacture of carpeting, particularly tufted carpeting, it is the general practice to coat the back of the carpet with a latex composition. In the case of tufted carpeting, this coating acts as an adhesive to secure the tufts in place so that they are not pulled out in normal use. A secondary backing or layer is sometimes applied to carpeting. Materials used for this purpose are woven jute, scrim or a woven or non-woven textile made of such synthetic materials as polypropylene, rayon, viscose, nylon, polyester acrylics or mixtures thereof. The principal purpose of this secondary backing or layer is to provide additional dimensional stability and stiffness to the carpet. A foamed material, such as a filled latex mixture which is foamed by beating in air, may also be applied as a secondary layer. Generally, after the foamed material is applied it must be dried and cured by the application of heat. This backing also increases the dimensional stability of the carpet and imparts a springiness when it is walked upon. However, the foamed type of secondary layer does not provide the stiffness that is generally provided by the secondary layer composed of the aforementioned materials. The secondary layers mentioned above are generally laminated to the carpet by the use of a latex composition.

Our U.S. Pat. No. 3,779,857, which is incorporated by reference in this case, discloses the use of a ternary mixture of granular starch, urea and borax as an extender for latex laminating compounds. Although this ternary mixture has been found to be exceedingly effective as an extender, the drying rate of the laminating material containing the ternary mixture is not as rapid as is sometimes desired.

We have now discovered that an extender consisting essentially of granular starch and borax in certain proportions and amounts can be used in polymeric latexes without substantially deleteriously affecting the functional properties of the latex while providing increased drying rates. Broadly, the weight ratio of granular starch to borax is from about 15:1 to about 12:1 and preferably is from about 10:2 to about 9:2. Up to about 66 parts by weight (basis 100 parts of latex polymer solids) of the extender consisting essentially of granular starch and borax may be used, although it is preferred that the latex composition contain up to about 25 parts by weight of extender when the composition is to be used for laminating textiles.

In the following discussion and in the Examples, the abbreviation "pbw" refers to parts by weight and is based upon the 100 parts of the latex polymer solids present unless otherwise specifically noted.

The latex composition of the present invention may contain materials which are generally used in latex compositions. For instance, since the present composition is particularly suitable for laminating carpeting, it may contain relatively large amounts of inorganic fillers. Exemplary of inorganic fillers are bentonite, $CaCO_3$, clays, colloidal silicates, diatomaceous earth, hydrated alumina, and zinc oxide. These fillers, in some cases, provide beneficial secondary properties to the composition such as opacity, fire retardance, stiffness and color. Generally, these fillers may be used in amounts up to 875 pbw, although it is preferred to use amounts up to 500 pbw in the composition of the present invention.

A wide variety of polymeric latexes may be used in the present composition. In the case of the composition being used for laminating textiles, it is preferred that the polymeric latex be cold SBR latex, cis-polyisoprene latex, butadiene, natural rubber latex, carboxylated butadiene-styrene latex, ethylene vinyl acetate latex, ethylene vinyl chloride latex or various mixtures thereof. These latexes require, if any, only small amounts of curing agents but must, however, be cured by the application of heat. The temperature at which the latex is cured must be below the thermal degradation temperature of the textile to which it is applied and thus, in most cases, must be below 300° F. Generally, latexes in which the polymer chain contains various functional groups pendant therefrom exhibit low temperature curing properties. Such polymers are made by the emulsion interpolymerization of a conjugated diene, such as butadiene, with an ethylenically unsaturated functional monomer, for instance, $\alpha$, beta-, unsaturated carboxylic acids, mono-esters of such dicarboxylic acids, acrylamides, N-methylol acrylamides, and the like. In addition to the functional monomer, there may also be present in the present composition one or more secondary copolymerizable monomers such as styrene, acrylonitrile, methyl methacrylate, vinylidene chloride, vinyl toluene, $\alpha$-methyl styrene and the like.

The presence of the secondary copolymerizable monomers is principally responsible for the stiffness and flexibility characteristics imparted to the laminated textile, the greater the proportion of secondary monomers, the less flexible and the stiffer is the laminated textile. In this respect, to obtain these characteristics to an optimum degree it is preferred that the amount of conjugated diene be from about 40 to about 75 pbw and the amount of secondary monomer be from about 60 to about 25 pbw. The most preferred composition contains amounts of conjugated diene of from about 45 to about 70 pbw and amounts of secondary monomer of from about 55 to about 30 pbw.

Copolymerized latexes may be prepared by methods well known in the art, such as emulsion polymerization techniques, including those techniques which utilize a small quantity of latex as a nucleating site for polymerization. Generally, seeding results in the polymerized latex being of greater average particle size.

In addition to the foregoing components, the composition of the invention may also contain various supplemental plasticizers. The principal purpose of such materials is to adjust the degree to which the cured films produced from the composition are plasticized. These are solvent-type plasticizers, i.e., rather high boiling, normally liquid organic compounds which are chemically inert toward the polymer, in which the copolymer is at least partially soluble and will therefore be readily softened by contact with the plasticizer. Appropriate plasticizers of this type include naphthenic and aromatic petroleum oils and synthetic organic compounds such as ester-type plasticizers and liquid polymers. Suitable ester-type plasticizers include the following: hexylene glycol, dimethyl phthalate, dibutyl phthalate, chlorinated diphenyls, tributyl phosphate, di-carbitol phthalate, dibutoxy-glycol phthalate, dimethoxy-glycol phthalate, butyl phthalyl butyl glycolate, methyl phthalyl ethyl glycolate, triglycol di-2-ethylbutyrate, triglycol di-2-ethylhexoate and phosphate-type plasticizers such as tributoxyethyl, tricreasyl, triphenyl, diphenyl octyl, diphenyl cresyl, tris-dichloropropyl, tris-chloroethyl, tris-dibromopropyl, and tris-dichloroisopropyl phosphates. Low molecular weight water-insoluble polyalkylene glycols, e.g. polypropylene glycols, are also suitable plasticizers. Also, liquid polymers may be used as plasticizers, for instance, liquid polybutylenes, liquid polybutadienes and liquid polyesters. Other materials such as antioxidants, defoamers, bactericides, emulsifiers, thickeners, dispersants and the like may be used in the present composition.

A wide variety of granular starches may be utilized in the present composition. For instance, granular starch derived from both root and cereal sources such as corn, potato, tapioca, wheat, waxy sorghum, waxy maize, grain sorghum, and rice. However, it is preferred that the granular starches used be modified by oxidation, acid treatment, ethoxylation and the like to lower the molecular weight of the starch but not to substantially destroy the granular structure of the starch and thus make it cold water soluble. It will be appreciated that mixtures of these starches may be used. The cold water solubility of the granular starch used in the present composition should be below about 30 percent by weight and preferably be below about 20 percent by weight. For purposes of the present invention, dextrins come within the definition of starch and may be used provided their cold water solubility characteristics fall within the above enumerated criteria.

Modification of granular starch by acid- and oxidative methods are well known in the art and there are presently commercially available a relatively large number of starches which have been modified by such methods.

The presence of granular starch will sometimes cause an increase in viscosity of the latex composition during storage. This change in viscosity can be avoided by having present in the composition a water-soluble polymeric thickening agent. Exemplary of such thickening agents are polyacrylates, hydrolyzed polyacrylonitriles and salts thereof and various alkyl ethers of cellulose, such as hydroxypropyl methyl cellulose, and hydroxyethyl methyl cellulose.

In order to more clearly describe the nature of the present invention, specific examples will hereafter be described. It should be understood, however, that this is done solely by way of example and is intended neither to delineate the scope of the invention nor limit the ambit of the appended claims.

In the Examples, various tests are referred to. These tests were performed by the following methods.

Stripback (Resistance to Delamination)

A 3 × 12 inches sample of laminated carpet is prepared and about one inch of the secondary backing is separated from the carpet by hand pulling. The delaminated end of the carpet is placed in the stationary vise of a Scott Tensile Tester and the delaminated end of the backing is placed in a movable vise. The backing is pulled at a fixed rate of 12 inches per minute and the average tensile force recorded in lbs. At least duplicate samples are run and the results averaged.

Green Strength

A 3 × 12 inches sample of laminated carpet is prepared, heated and maintained at 275° F. for various periods before cured and the procedure for the determination of stripback followed.

Brookfield Viscosity

A Brookfield Viscometer RVF model using a No. 5 spindle was used for viscosity measurements under 20,000 centipoise and a No. 6 spindle was used for viscosity measurements over 20,000 centipoise. The viscosities were determined at 20 rpm.

EXAMPLE I

This example illustrates the use of an extender comprising a mixture of granular starch and borax at various levels in adhesive compositions and compares the properties of the resulting adhesives with the properties of an adhesive which does not contain the mixture and with the properties of adhesives which contain a ternary mixture of an extender comprising starch, urea and borax.

A series of carboxylated butadiene-styrene latexes were prepared by emulsion polymerization methods well known in the art to achieve a monomer conversion of at least 90%. After the completion of the polymerization, each of the resulting latexes were stripped to a polymer solids level of 50 to 55 percent by weight. Into each of the latexes were added 415 pbw $CaCO_3$ (whiting), sufficient polyacrylate thickener to adjust the initial viscosity to a range of 12,500 to 14,800 cps and the amounts of extender set forth in Table I. Each of the latexes was roller coated onto the back of a medium shag tufted carpet at a weight of 22 oz./yd² of carpet and then laminated to a jute backing. The resulting laminates were cured and dried by heating at 270° F for 20 minutes.

Various properties of the latexes and the laminate were determined and are set forth below in Table I:

TABLE I

| Extender Starch/Borax/Urea (Weight Ratio) | | | Parts by Weight (pbw) | Gelling Characteristics* Temperature/Viscosity | | Strip Back (lbs.) | Tuftlock (lbs.) | Green Strength | |
|---|---|---|---|---|---|---|---|---|---|
| | | | | (° F.) | (Centipoise) | | | (Min.) | (lbs.) |
| None | None | None | 0 | 75 | 13,000 | | | 3 | 1.8 |
| | | | | 100 | 14,000 | | | 5 | 3.6 |
| | | | | 125 | 14,000 | 10.0 | 5.0 | 8 | 5.7 |
| | | | | 150 | 18,000 | | | 12 | 9.2 |
| | | | | 175 | 26,000 | | | | |
| 9 | 2 | None | 12 | 75 | 13,000 | | | | |
| | | | | 100 | 14,000 | | | 3 | 2.0 |

TABLE I-continued

PROPERTIES OF LATEXES AND LAMINATE

| Extender Starch/Borax/Urea (Weight Ratio) | | | Parts by Weight (pbw) | Gelling Characteristics* Temperature/Viscosity | | Strip Back (lbs.) | Tuftlock (lbs.) | Green Strength | |
|---|---|---|---|---|---|---|---|---|---|
| | | | | (°F.) | (Centipoise) | | | (Min.) | (lbs.) |
| | | | | 125 | 17,000 | 10.8 | 5.6 | 5 | 4.0 |
| | | | | 150 | 19,000 | | | 8 | 6.0 |
| | | | | 175 | Solid | | | 12 | 9.8 |
| 9 | 2 | 5.7 | 20 | 75 | 13,200 | | | | |
| | | | | 100 | 12,200 | | | 3 | 1.8 |
| | | | | 125 | 11,500 | 8.8 | 5.5 | 5 | 3.0 |
| | | | | 150 | 12,000 | | | 8 | 4.5 |
| | | | | 175 | 21,000 | | | 12 | 7.6 |
| 5.5 | 1.2 | None | 7.2 | 75 | 11,800 | | | 3 | 2.0 |
| | | | | 100 | 13,800 | | | 5 | 3.5 |
| | | | | 125 | 13,200 | 9.4 | 6.0 | 8 | 8.5 |
| | | | | 150 | 13,500 | | | 12 | 9.8 |
| | | | | 175 | 24,500 | | | | |
| 5.5 | 1 | 3.5 | 12 | 75 | 13,000 | | | | |
| | | | | 100 | 16,000 | | | 3 | 1.8 |
| | | | | 125 | 15,000 | 10 | 5.0 | 5 | 3.3 |
| | | | | 150 | 16,000 | | | 8 | 5.8 |
| | | | | 175 | Solid | | | 12 | 9.2 |
| 17 | 3.8 | None | 25 | 75 | 13,000 | | | | |
| | | | | 100 | 20,000 | | | 3 | 1.8 |
| | | | | 125 | 21,000 | 9.8 | 6.7 | 5 | 3.0 |
| | | | | 150 | Solid | | | 8 | 4.9 |
| | | | | 175 | Solid | | | 12 | 9.0 |
| 17 | 3.8 | 10.8 | 45 | 75 | 14,800 | | | | |
| | | | | 100 | 16,400 | | | 3 | 1.0 |
| | | | | 125 | 16,000 | 8.5 | 6.0 | 5 | 2.0 |
| | | | | 150 | 16,200 | | | 8 | 3.5 |
| | | | | 175 | 28,500 | | | 12 | 6.0 |

*Gelling characteristic is an indication of the ability of hot latex to penetrate into the carpet, the higher the viscosity the lesser the degree of penetration.

EXAMPLE II

This example illustrates the effect of using increasing amounts of an extender comprising a mixture of granular starch and borax in an adhesive composition.

A series of carboxylated butadiene-styrene latexes containing varying amounts of a starch-borax extender were prepared and laminated onto a carpet as set forth in Example I. The properties of the laminates were determined and are set forth in Table II below. In all the latexes the starch to borax weight ratio was 9:2.

TABLE II

| Amount of Extender (pbw) | Strip Back (lbs.) |
|---|---|
| None | 10.0 |
| 12 | 10.8 |
| 25 | 9.8 |
| 45 | 6.0 |
| 66 | 5.0 |

From Table II it is apparent that when the laminates contained between 25 and 45 pbw of extender, the stripback characteristics of the laminates were deleteriously affected.

EXAMPLE III

This example illustrates the use of a mixture of granular starch and borax in a natural latex and in a cold SBR latex.

A natural latex and a cold SBR latex were prepared according to methods well known in the art. Into each of the latexes were added 400 pbw CaCO$_3$ (Whiting), sufficient polyacrylate thickener to adjust the initial viscosity of the latexes to about 12,000 cps and the amounts of extender set forth in Table III. Each latex contained about 70 percent total solids. The latexes were roller coated onto a nylon tufted carpeting at a weight of 28 oz./yd$^2$ of carpet and then laminated to a jute backing. the resulting laminates were cured at 275° F. for 30 minutes using a sulfur cure system. Stripback values of the laminates were determined and are set forth in Table III.

TABLE III

| | Properties of Laminates | | |
|---|---|---|---|
| Latex | Extender Starch/Borax (Weight Ratio) | Extender Parts by Weight (pbw) | Strip Back (lbs.) |
| Natural Latex | None | 0 | 7.5 |
| Natural Latex | 9/2 | 12 | 7.0 |
| Cold SBR Latex | None | 0 | 6.0 |
| Cold SBR Latex | 9/2 | 12 | 6.0 |

EXAMPLE IV

This example compares the drying rate of a laminate containing an extender comprising a mixture of granular starch and borax with the drying rate of a laminate containing an extender comprising a mixture of granular starch, borax and urea.

Carboxylated butadiene-styrene latexes were prepared as set forth in Example I. One of the latex compositions contained 12 pbw of a starch-borax mixture at a weight ratio of 9:2 and the other contained 12 pbw of a starch-borax-urea mixture at a weight ratio of 5.5:1:3.5. Each of the latexes contained 415 pbw CaCO$_3$ (Whiting) and sufficient polyacrylate thickener to adjust the viscosity of the latexes to about 14,000 cps. The latexes were roller coated onto a medium shag carpeting at a weight of 28 oz./yd$^2$ of carpet.

Standard size pieces of the wet laminated carpet were placed in an oven on a hanging wire mesh screen attached to a triple beam balance outside the oven. The temperature of the oven was maintained at 270° F and at 2 minute intervals the percent weight loss of the water contained in the laminates was determined. The results are set forth in Table IV.

TABLE IV

| Time (min.) | 12 pbw Extender Consisting of 9:2 Starch/Borax Mixture | 12 pbw Extender Consisting of 5.5:1:3.5 Starch/Borax/Urea Mixture |
|---|---|---|
| | Per Cent Moisture Loss | Per Cent Moisture Loss |
| 2 | 21 | 18 |
| 4 | 48 | 39 |
| 6 | 75 | 62 |
| 8 | 94 | 84 |
| 10 | 100 | 97 |
| 12 | 100 | 100 |

What is claimed is:

1. A latex composition comprising an elastomeric polymer latex and up to about 66 parts by weight of an extender per 100 parts of said polymer latex consisting essentially of a mixture of granular starch and borax, the weight ratio of granular starch to borax being from about 1.5:1 to about 12:1.

2. A latex composition as defined in claim 1, wherein the weight ratio of granular starch to borax is from about 10:2 to about 9:2.

3. A latex composition as defined in claim 2, wherein the cold water solubility of the granular starch is below about 20 percent by weight based upon the weight of the starch.

4. A latex composition as defined in claim 3, wherein the polymeric latex is a carboxylated butadiene-styrene latex.

5. A textile article comprising a textile coated with the latex composition defined in claim 1.

6. A textile article comprising a textile coated with the latex composition defined in claim 4.

7. A latex composition as defined in claim 1, wherein the extender comprises up to about 25 parts by weight per 100 parts of polymeric latex of the latex composition.

8. A latex composition as defined in claim 1, wherein the polymeric latex comprises an interpolymerized conjugated diene and an ethylenically unsaturated functional monomer.

9. A latex composition as defined in claim 1, wherein the granular starch is selected from the group consisting of oxidized starches, acid treated starches, ethoxylated starches and mixtures thereof.

* * * * *